United States Patent [19]

Oskarsson et al.

[11] Patent Number: 4,698,205

[45] Date of Patent: Oct. 6, 1987

[54] BODY WITH INTERNAL CHANNELS AND METHODS OF PRODUCING THE SAME

[75] Inventors: Rolf G. Oskarsson, Rönninge; Johan P. Von Holst; Erik G. Eriksson, both of Sandviken, all of Sweden

[73] Assignee: Santrade Limited, Lucerne, Switzerland

[21] Appl. No.: 811,398

[22] Filed: Dec. 20, 1985

[30] Foreign Application Priority Data

Dec. 20, 1984 [SE] Sweden .................................. 8406501

[51] Int. Cl.$^4$ .......................... B22F 7/08; B23P 15/32
[52] U.S. Cl. ....................................... 419/5; 76/108 R
[58] Field of Search ............. 76/108 R, 101 R; 419/5

[56] References Cited

FOREIGN PATENT DOCUMENTS 1161863  8/1969  United Kingdom ................... 76/108

Primary Examiner—Roscoe V. Parker
Attorney, Agent, or Firm—Burns, Doane, Swecker & Mathis

[57] ABSTRACT

A method of producing coolant channels in a metallic object such as a cutting tool whereby a blank is formed by at least one working step such as compaction etc. and the channels are formed by cores whereby the working takes place as a compaction at a temperature of at least 950° C. and that the core thereafter is removed in a separate step.

9 Claims, 2 Drawing Figures

BODY WITH INTERNAL CHANNELS AND METHODS OF PRODUCING THE SAME

BACKGROUND OF THE INVENTION

The present invention relates to compound bodies and other bodies with internal channels and methods of producing the same. It applies in particular to compound tools provided with coolant channels.

Compound bodies for tools and wear parts with a hard material containing 30–70 vol% hard constituents are disclosed in Swedish patent application No. 8302735-9 and U.S. Pat. No. 4,168,540. It has according to this application surprisingly enough turned out to be possible to co-extrude two materials with different properties, particularly different deformation resistance.

In many tool applications it is desirable to deliver coolant directly to the working edge. The purpose of the coolant is not only to remove heat but also to facilitate chip removal.

Until now it has been possible down to a certain dimension, about 12 mm, to drill a hole in the core of cutting tools, such as twist drills, and then drill inclined holes from the rake faces to the centre hole. This is very expensive and, as mentioned, dimensionally limited at the lower end of the range of diameters. In such a tool it is not possible to cut and grind a new edge since in such a case a hole in the center is obtained.

A method previously used to make bodies with coolant channels is to place a coil of copper or similar material in a powder body and then sinter. The copper is herewith absorbed by the porous body when the melting point of copper is exceeded and a hole remains which can possess a complicated geometry. The disadvantages are that copper lowers the tool toughness and that slender products cannot be produced economically.

Other methods which are known employ for example wax instead of copper. Such a core of wax is melted away before the sintering of the compact takes place. A complicated wax profile, for example a helix, can, however, not be compacted into a powder body. The wax profile would be compacted into a powder body. The wax profile would be deformed due to the high compacting pressure. Other techniques therefore have to be used. One such method is first to compact a center core, put in the wax cores (after possible grooves have been made) and press an outer cover onto the powder-wax-cores.

A temporary filling such as wax and other low melting materials such as copper may prevent the body from being deformed after the removal of the temporary filling because the holes are welded together. Moreover, it is a very expensive way of obtaining holed blanks in slender dimensions.

The present invention relates to tools such as drills, end mills, threading tapes, broaches, etc., with coolant channels down to more slender dimension than previously possible on the one hand, and economical methods of obtaining these on the other.

With the present invention considerable length of slender holed bars can be obtained after only one operation comprising production of a blank with a filler material which is removed after extrusion etc and after cutting up in smaller lengths.

To provide a sufficient amount of coolant, the diameter of the channels should be more than 0.5 mm, preferably more than 1 mm.

THE DRAWINGS

The invention is described in more detail in the following specification and drawings which show:

FIG. 1 depicts a shank end mill in cross-section, and
FIG. 2 depicts a compound material blank with welded shaft and coolant channels in longitudinal section.

DESCRIPTION OF PREFERRED EMBODIMENTS OF THE INVENTION

Figure 1:
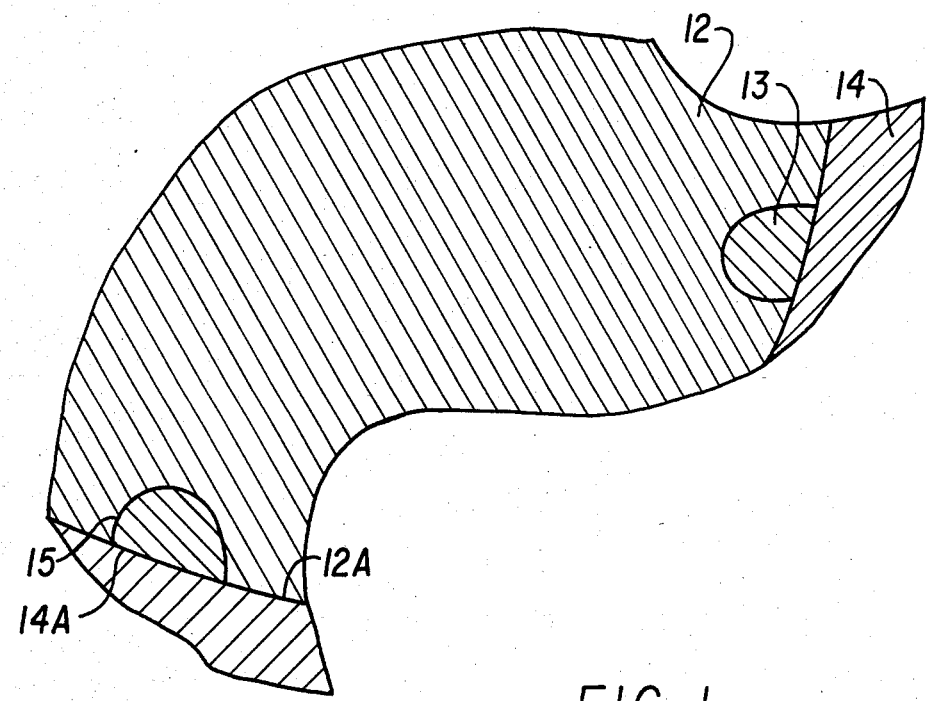

According to one embodiment of the invention a core of tool steel or high speed steel consisting of either solid material or a cold isostatically pressed body is first produced. Then suitable fore-to-aft grooves are made in this core and filled with a metal filler material with a suitable melting point (this metal can be in solid form of correct cross section or compacted cold-isostatically from powder in these grooves). Then a 'cover' of, for example, a hard particle rich powder with 30–70 vol% hard constituents is compacted cold-isostatically, alternatively, a solid case of, for example, high speed steel or other tool material is slipped over the core with its filled grooves and all of it is placed in an extrusion can of suitable dimension. Finally, the can is welded and hermetically sealed after evacuation, (if such is needed) whereby an extrusion blank is obtained, which after extrusion at a temperature not less than 950° C. forms a bar containing interconnected 'streaks' of the relatively low melting metal lying in the transition zone between the two previously mentioned parts 'core' and 'cover' respectively. These two parts can of course be of the same material e.g. hard material with 30–70 vol% hard constituents in the form of carbides, nitrides and/or carbonitrides of Ti, Zr, Hf, V, Nb, Ta, Cr, Mo and/or W in a matrix based on Fe, Ni and/or Co or high speed steel or of different materials e.g. hard material in the cover and high speed steel or tool steel in the core, alternatively, high speed steel in the cover and tool steel in the core, all depending on which properties are desired for the final product.

The low melting material can be chosen in accordance with the process factors that are present. If the compaction is performed below or about 1000° C. it may be suitable to choose copper as the low melting metal, whereas this metal is not suitable when working at the melting point of copper or higher temperature e.g. 1050°–1150° C., when a metal or alloy with higher melting point must be chosen e.g. copper-nickel alloy with 40% nickel which has a melting point of 1170° C. It is important to have sufficient difference between the melting point of the low melting component and the compaction temperature, at least 25° C., preferably 100° C., since a great amount of heat is generated during compaction, in particular, if the latter is performed by hot extrusion. The melting point of the metallic alloy which after melting gives the coolant channels must have a definite relation to the extrusion temperature i.e. the temperature to which the blanks are heated prior to extrusion. A material which is difficult to extrude, e.g. a material with a high content of hard constituents generates much deformation heat which leads to considerable temperature increase in the material during the extrusion. Temperature increases of 100° C. have been established. For a material which does not generate so much deformation heat, the rise of temperature will, of course, be much lower.

The extrusion ratio, i.e. the ratio between the cross sectional area of the extrusion blank and cross section area of the extruded bar is also of importance. Of course, a high extrusion ratio gives a high heat generation. From this it is evident that the aforementioned relation between extrusion temperature and melting temperature of the material later to be melted away varies according to the conditions given.

The bar obtained in this way is cut up in desired lengths. Then the low melting alloy is melted away and a bar with channels is obtained. The melting must be done in such a way that e.g. oxidation of the melt is avoided with accompanying formation of slag or scale, which may make the removal of the alloy more difficult. This requires e.g. vacuum or protective gas, therefore the different alloys are treated in different ways.

It has been established that apart from straight longitudinal channels in the core, which of course result in straight channels after the extrusion, also more complicated and even irregular channels can be made which are retained in modified form after the extrusion. It has thus proved possible to make for example helix shaped channels which after extrusion and melting result in small helical channels. Such a bar is perfectly suitable for the production of, for example, a twist drill or end mill where the cooling is obtained near the peripheral cutters and large chip spaces can be produced without damaging the channels. This requires a careful balance between the lead of helix for the original spiral in the original core and the extrusion ratio i.e. the area reduction so that correct lead of helix is obtained of the spiral of the finished bar i.e. the pitch of the channels corresponds to the helix angle of the twist drill. The grinding of the grooves for the drill then starts from the position of the channels so that the latter are situated at the correct distance from the main cutting edges, see FIG. 1 where 14 is hard particle-rich cover material, 12 is core material, 13 is the filler material and 15 are the fore-to-aft extending channels. The core 12 and cover 14 include opposing surfaces 12A, 14A, respectively, which define an interface between the core and cover.

The second embodiment of the invention does not use melting for removal of the material in the channels. It has, surprisingly enough, proved to be possible to use a mechanical core bar removal method down to much slenderer dimensions than has previously been regarded as possible. Channels down to a diameter of the order of 1 mm have been obtained. More slender channels are not so interesting from a capacity point of view since the fluid supplied is on the one hand to cool and to facilitate the chip transport on the other. The degree of slenderness of the channels which can be obtained by removal of the core bar by mechanical means is partly a function of the lengths of the blanks upon which the method is performed. It can of course be possible to continue the core bar removal to finer dimensions than have been considered here but then, as has been stated above, the ability of the channels to supply coolant becomes uninteresting for the applications being considered on one hand and the method becomes uneconomical on the other.

Core bar removal by mechanical means is of course limited to straight channels. A spiral can, however, be hot twisted afterwards.

The second embodiment described above differs from the first only in the method of removing the material from the channels. Among the advantages to be obtained can be mentioned reduced sensitivity to high heat generation during the extrusion. Among the drawbacks which occur, the difficulty of forming other than straight channels is the one which dominates.

An example of a suitable material which allows the core to be extracted is manganese steel with high manganese content, i.e., so called Hadfield steel.

An alternative to spiral shaped channels, which are formed directly, is first to make straight grooves in a core and then make a spiral by twisting the hot extruded bar. This method is particularly suitable when the compound material consists of e.g. an outer layer of cobalt alloyed high speed steel and an inner layer of a material other than cobalt alloyed high speed steel or tool steel.

Figure 2:
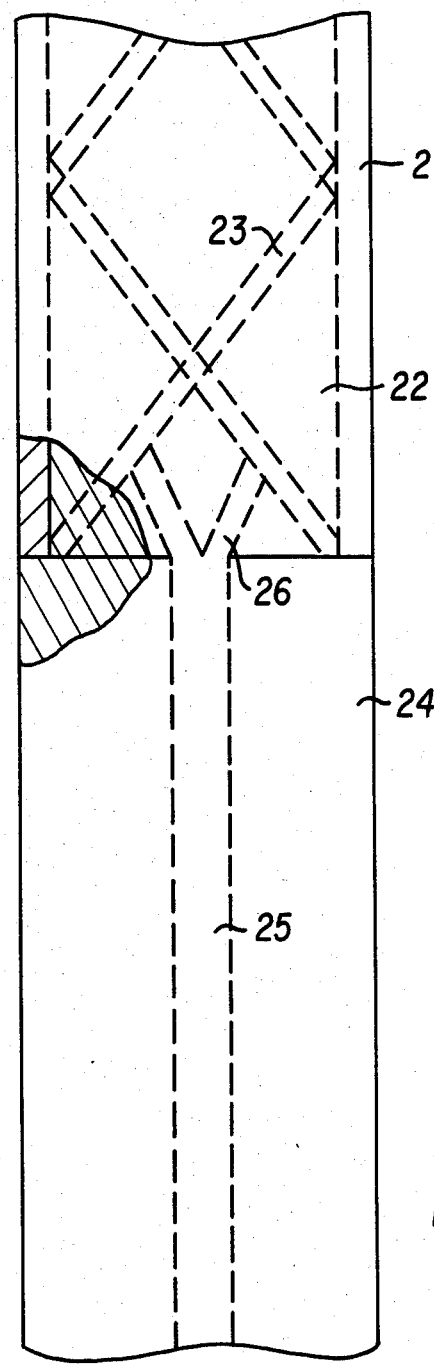

It is of interest to save expensive and holed material particularly for coarser dimensions. This is possible by welding a short length of compound material according to the invention on a centerholed i.e. tubular shank of cheaper material for example tool steel. In order to retain open channels on one hand and allow welding on the other, which is difficult if only hard material is used on one of the two parts to be joined, special measures are required. One way is to drill inclined holes between the channels and the center of the part of the compound blank later to be welded to the simpler shank, to the channels. If the shank is provided with a fore-to-aft extending center hole, a cooling system throughout is obtained, see FIG. 2 in which 21 is hard particle rich material, 22 is core material, 23 are channels, 24 is shaft material, 25 is a centerhole and 26 is the drilled hole. The rear part of the shank can of course be plugged up and feeding holes can be drilled on the mantle of the shank, depending on how the media supply is arranged through the chuck.

It has also been found possible to drill two fairly closely situated holes in a solid high speed steel blank which are then filled with material which is later removed. These holes are drilled in such a way that after extrusion and removal of the material, they are situated in the center core which is always present in for example drills and end mills i.e. the chip channels can be ground without damaging the coolant channels. This solution is best suited for slender dimensions since it is necessary to consider where the openings of the coolant channels are when grinding the main cutting edges of a twist drill or the chisel edges of an end mill. Slender tools are not reground. A two flute twist drill which is to be cut before the regrinding must then be cut in such a way as to correspond to half a turn of the helix in order that the openings are not placed unsuitably, end mills in multiples of $\frac{1}{4}$ turn (if they are four flute) etc.

Finally it has proved to be possible to drill holes in high speed steel and tool steel cores and fill them according to above and then cold isostatically compact over them covers of material rich in hard constituents, whereafter extrusion and cleaning of the channels are performed according to the method described previously. Hereby bars with hard particle enrichment in the cover are obtained in combination with channels in the core that remain untouched as the tool is reground. When testing it has proved that these tools have a considerably improved tool life than corresponding tools without the coolant channels. Since coolant is not delivered to the areas that work at the highest cutting speed, the same improvement is not obtained as for example when the coolant channel opens at the interface between hard particle rich material and corresponding core. Regrinding is also problematic, see preceding clause.

Tools, on which coolant and/or lubrication at the bottom is particularly important include threading taps, in which the channels suitably open out in the middle and then do not need to be twisted. They are not affected by the weakness mentioned in the clause above when it applies to twist drills. In order not to weaken the tool the channel in this case is placed in the center since this part transfers very little of the moment.

The examples below give some applications, illustrating the various possibilities of the invention.

EXAMPLE 1

On a core with diameter 40 mm of high speed steel type M2 (0.85% C, 4.0% Cr, 5.0% Mo, 6.5% W, 2% V) two outer spiral grooves with suitable pitch were turned. The grooves were filled with a wire of Cu-Ni alloy whereafter the whole core blank was placed in the centre of a press tool. TiN-enriched high speed steel powder was filled into the remaining space and compacted cold-isostatically to a blank with outer diameter 69±1 mm which was placed in an extrusion can of carbon steel with an outer diameter of 76 mm and 3 mm wall thickness. It was then heated to 1125° C. for 45 min whereafter a round bar with diameter 12 mm was extruded.

From the extruded bar, drill blanks were cut up in lengths of 135 mm. At subsequent heating to 1200° C. the Cu-Ni alloy was melted away from the drill blank.

After grinding away the carbon steel can and hardening+tempering, a drill blank was obtained with a diameter of 10 mm ready for flute grinding and final grinding. With a spiral angle of 29.7° and locating with the aid of the channels, two 4.3 mm deep spiral grooves could be ground to a length of 92 mm with the twisted holes symmetrically located in the spiral formed parts of the drill.

The drills were finally ground to normal geometry and after that compared to traditional high speed steel drills with and without holes, respectively, for cutting fluid. As workpiece materials unalloyed and lowalloyed carbon steel type SS 1672 and SS 2541, respectively, were used.

Result:

|  | Relative cutting rate | Relative drilling length |
| --- | --- | --- |
| HSS-standard | 1.0 | 1.0 |
| HSS with holes | 1.3 | 1.0 |
| Material according to the invention | 3.2 | 1.6 |

Apart from the possibility of increasing the cutting speed, drilled length and feed, also better tolerances of the drilled hole were obtained, since the chips were effectively flushed out of the hole. For the same reason deeper holes could be drilled without problem.

EXAMPLE 2

As in the preceding example except that cobalt alloyed high speed steel powder type T42 (1.33% C, 4.0% Cr, 3.0% Mo, 9.0% W, 9.5% Co, 3.0% V) was used instead of TiN-enriched high speed steel powder. In the same way as in the preceding example twist drills were produced with 10 mm diameter. These were tested by drilling in tough-hardening steel type SS 2541 (0.39% C, 0.40% Si, 0.80% Mn, 0.035% P, 0.035% S, 1.6% Cr, 1.6% Ni, 0.25% Mo).

Result:

|  | Relative cutting rate | Relative drilling length |
| --- | --- | --- |
| HSS-standard | 1.0 | 1.0 |
| HSS with holes | 1.3 | 1.0 |
| Material with hole according to the invention and T42 in the cover | 1.6 | 3.2 |

The same positive tendencies as in the previous example were obtained.

EXAMPLE 3

A 9 mm hole 8 mm from the center of the core was drilled in a core of high speed steel M2 (0.85% C, 4.0% Cr, 5.0% Mo, 6.5% W, 2% V) with a diameter of 45 mm. A bar of manganese steel treated with a release agent was placed in the hole and the whole blank was placed in the centre of a pressing tool which was filled with TiN enriched powder in the same way as in example 1. After extrusion to a bar suitable for a 12 mm end mill the manganese steel bar with a diameter of 2 mm could be removed from the bar. The blank was hardened and finally ground to a conventional drilling end mill with a 2 mm internal coolant channel displaced 1.5 mm from the centre of the end mill.

When testmilling deep key-ways with this tool and with cutting fluid supplied through the spindle of the milling machine, it could be concluded that, when compared to end mills without coolant channels, the test mill maintained much closer tolerances of the key-way and substantially better surfaces and could be used for deeper grooves since the chips were effectively flushed away. Since chip stoppages was almost eliminated, the risk of tool fracture was greatly decreased.

EXAMPLE 4

In a core of high speed steel M35 (0.85% C, 4.0% Cr, 5.0% Mo, 6.5% W, 2% V, 5% Co) with a diameter of 40 mm two symmetrically placed holes with a diameter of 10 mm, each 10 mm from the centre, were drilled. In the same way as in example 3 the holes were filled with manganese steel and the blank was placed in the centre of a pressing tool which was filled with TiN-enriched powder as in example 1. A bar with a dimension suitable for 10 mm drill blanks was extruded and the two strings of manganese steel now with a diameter of 2 mm could be removed from the bar. The cut blank was ground round, hardened and grooves were ground, located by the coolant channels with straight flutes, and finally ground as a conventional twist drill according to the chisel edge etc.

Due to the fact that the flutes of the drill were straight, simple grinding machines could be used and the cost be kept low. When testing with cutting fluid through the coolant channels in unalloyed carbon steel type SS 1672 it was found that the chips were effectively flushed away from the hole with the cutting fluid even though the drill was not twisted. Also deep holes could be drilled without having to remove the chips.

We claim:

1. A method of producing a metal tool, such as a cutting tool, having at least one coolant channel therethrough, comprising the steps of:

forming a body by:
 providing a core having a fore-to-aft dimension and a first surface,
 providing a cover against said core such that a second surface of said cover opposes said first surface and forms therewith an interface between said core and cover,
  one of said core and cover provided in powder form, and the other of said core and cover provided in non-powder form, and
 providing a metallic filler material in a fore-to-aft extending groove formed at said interface in one of said first and second surfaces such that said filler material contacts said core and said cover,
subjecting said body to compaction pressure and heat at a compaction temperature lower than the melting temperature of said filler material to permanently unite said powder material of said one of said core and said cover, and
removing said filler material such that said groove defines a coolant channel.

2. A method according to claim 1, wherein said step of providing said filler material comprises providing said filler material in a non-linear groove.

3. A method according to claim 2, wherein said step of providing said filler material comprises providing said filler material in a non-linear groove in said first surface.

4. A method according to claim 1, wherein said subjecting step comprises an extrusion step.

5. A method according to claim 1, wherein said removing step comprises heating said body to a temperature greater than the melting temperature of said filler material.

6. A method according to claim 1, wherein said removing step comprises a mechanical operation.

7. A method according to claim 1, wherein said other of said core and said cover is provided as a high speed steel material.

8. A method according to claim 1, wherein said compaction temperature is at least 25° C. less than the melting temperature of said filler material.

9. A method according to claim 1, wherein said step of providing said filler material comprises providing said filler material in said first surface.

* * * * *